United States Patent
Lindgren et al.

(10) Patent No.: US 6,980,545 B1
(45) Date of Patent: Dec. 27, 2005

(54) APPARATUS FOR ROUTING ASYNCHRONOUS TRAFFIC IN A CIRCUIT SWITCHED NETWORK

(75) Inventors: Per Lindgren, Stockholm (SE); Christer Bohm, Nacka (SE); Bengt J. Olsson, Tumba (SE)

(73) Assignee: NET Insight AB, Stockholm (SE)

( * ) Notice: Subject to any disclaimer, the term of this patent is extended or adjusted under 35 U.S.C. 154(b) by 0 days.

(21) Appl. No.: 09/806,782

(22) PCT Filed: Oct. 7, 1999

(86) PCT No.: PCT/SE99/01798

§ 371 (c)(1),
(2), (4) Date: Jun. 28, 2001

(87) PCT Pub. No.: WO00/21255

PCT Pub. Date: Apr. 13, 2000

(30) Foreign Application Priority Data

Oct. 7, 1998 (SE) .................................. 9803417

(51) Int. Cl.[7] ............................................ H04L 12/66
(52) U.S. Cl. ................................................... 370/352
(58) Field of Search ........................ 370/352, 389–396, 370/460, 489–493, 285, 338, 328, 322, 312, 370/474; 398/79; 375/324–326, 354, 355, 375/364; 710/52; 348/423.1, 484, 515

(56) References Cited

U.S. PATENT DOCUMENTS 5,502,723 A * 3/1996 Sanders ....................... 370/352
5,625,846 A * 4/1997 Kobayakawa et al. .......... 710/52
5,764,392 A * 6/1998 Van As et al. ................ 398/79
6,341,127 B1 * 1/2002 Katsube et al. .............. 370/352

FOREIGN PATENT DOCUMENTS

| EP | 0537743 A1 | 4/1993 |
| WO | WO 9417617 A1 | 8/1994 |
| WO | WO 9501031 A1 | 1/1995 |
| WO | WO 9703526 A2 | 1/1997 |

OTHER PUBLICATIONS

Bohm et al., "The DTM Gigabit Network", J. of High Speed Networks, vol. 3, pp109-126 (1994).

* cited by examiner

Primary Examiner—Chi Pham
Assistant Examiner—Prenell Jones
(74) Attorney, Agent, or Firm—Finnegan, Henderson, Farabow, Garrett & Dunner L.L.P.

(57) ABSTRACT

The present invention refers to an apparatus providing routing of asynchronous traffic in a circuit switched synchronous time division multiplexed network, said apparatus comprising an interface (12) providing access to a multi-channel bitstream carrying isochronous channels; routing means (26) for providing routing of data packets; and a communication medium (24) interconnecting said interface and said routing means. According to the invention, said interface (12) comprises means (18) for deriving data packets received in at least one of said isochronous channels, means (22) for transmitting only header portions of said data packets to said routing means via said communication medium (24), means (20) for temporarily storing at least body portions of said data packets, and means (22, 32) for forwarding said data packets in accordance with routing instructions received from said routing means.

16 Claims, 3 Drawing Sheets

APPARATUS FOR ROUTING ASYNCHRONOUS TRAFFIC IN A CIRCUIT SWITCHED NETWORK

TECHNICAL FIELD OF INVENTION

The present invention refers to an apparatus providing routing of asynchronous traffic in a circuit switched synchronous time division multiplexed network, said apparatus comprising: an interface providing access to a multi-channel bitstream carrying isochronous channels; routing means for providing routing of data packets; and a communication medium interconnecting said interface and said routing means.

BACKGROUND OF THE INVENTION

Today, new types of circuit-switched communication networks are being developed for the transfer of information using synchronous time division multiplexed bitstreams. Within this field, a new technology, referred DTM (Dynamic synchronous Transfer Mode), are currently being developed, primarily addressing the problem of providing quality of service to users of real-time, broadband applications.

The structure of a DTM network has been described in, e.g., "The DTM Gigabit Network", Christer Bohm, Per Lindgren, Lars Ramfelt, and Peter Sjödin, Journal of High Speed Networks, 3(2):109–126, 1994, and in "Multi-gigabit networking based on DTM", Lars Gauffin, Lars Häkansson, and Björn Pehrson, Computer networks and ISDN Systems, 24(2):119–139, April 1992.

The basic topology of a DTM network is preferably a bus with two unidirectional, multi-access, multi-channel optical fibers connecting a number of nodes, each node being arranged to serve one or more end users connected thereto. However, the topology may just as well be any other kind of structures e.g. a ring structure or a hub structure.

When transferring asynchronous traffic, such as TCP/IP packets or Ethernet frames, a mechanism for providing routing of such traffic through, e.g., a DTM network is needed. This is typically solved by the provision of routing apparatuses at different locations in the network.

Typically, such a routing apparatus comprises one or more interfaces providing access to respective multi-channel bitstreams carrying isochronous channels, a routing processor for providing routing of data packets, and a communication bus interconnecting said interfaces and said routing processor.

A problem in this type of routing apparatus is that the capacity demand placed upon on the routing processor, as well as the transfer capacity demand placed upon the communication bus, becomes high as several interfaces needs access to the function provided by the one routing processor. When these demands exceed the available capacity, blocking will occur, resulting in delays or even loss of data.

An object of the invention is therefore to provide a routing apparatus designed to reduce the risk of lack of capacity, thereby limiting the occurrence of blocking or loss of data in relation to the routing processor.

SUMMARY OF THE INVENTION

The above mentioned and other objects of the invention are achieved by the invention as defined in the accompanying claims.

According to an aspect of the invention, there is provided and apparatus of the kind mentioned in the introduction, wherein said interface comprises means for deriving data packets received in at least one of said isochronous channels, means for transmitting only header portions of said data packets to said routing means via said communication medium, means for temporarily storing at least body portions of said data packets, and means for forwarding said data packets in accordance with routing instructions received from said routing means.

The invention is thus based upon the idea of limiting the amount of data transferred on said communication medium, and consequently handled by the routing processor, by only transmitting the header portion of each data packet from said interface to said routing processor, while storing the data packet, or at least the remaining part of the data packet, at said interface. Thus, the communication medium and the routing processor do not have to handle the entire data packet, but merely a small portion thereof. Typically, in many applications the only portion of the data packet that actually has to be transmitted to the routing processor will be the destination address of the data packet, even though the invention is not limited thereto.

An advantage of the invention is that a lesser amount of data is transmitted over said communication medium, which typically is a processor bus, thereby reducing the risk of transfer capacity shortage at the communication bus. Another advantage of the invention is that the routing processor is not required to store an entire data packet, but merely needs to handle a header portion thereof. Furthermore, if the step of deriving or extracting the destination address, or other desired information, from the data packet is performed at said interface, the routing processor is relieved from the burden of extracting such information, thereby further reducing the need for processing capacity at the routing processor.

Event though the invention provides a significant advantage with reference to the situation wherein one interface is connected to the routing processor, the advantage is of course magnified in a situation wherein several interfaces are connected to access one or more routing processor.

According to a preferred embodiment of the invention, said interface comprises selecting means for determining if a header portion of a data packet is to be sent to said routing means, and wherein said means for transmitting only header portions of said data packets to said routing means are arranged to control the transmission of header portions according to decision made by said selecting means. Preferably, said selecting means comprises a table designating destination addresses of data packets for which the header portions thereof are not to be transmitted to said routing means.

Typically, in such an embodiment, only header portions of data packets that actually require routing by the routing processor are transmitted over the communication medium to the routing processor. However, header portions of data packets that are to be discarded at said interface (i.e. that are not to be routed at all), that are to be transmitted using another channel accessed by said interface, and/or that are to by bypassed (i.e. transmitted in the same channel as they were received in at said interface) are not directed to the routing processor. Instead, the decision on how to handle such data packets is performed locally at said interface. This will of course further reduce the capacity demand placed upon the routing processor as well as the communication medium.

Preferably, said selecting means will be continuously updated with routing information provided by said routing means, said selecting means thereby receiving information as to which destination addressed that actually does not required data packets, or header portions thereof, to be transmitted to the routing processor.

Furthermore, the features defining this embodiment of the invention may actually be seen as defining a novel invention as such. In other words, the solution of performing local routing decisions at said interface without involving the routing processor, based upon information continuously provided and updated by the routing processor, may, per se, be regarded as an inventive idea.

Generally, all channels of said multi-channel bitstream need not be received and processed by said interface, while some channels may simply be bypassed at said interface. Therefore, said interface will typically comprise means for determining which channels of said multi-channel bitstream that are to be received by said interface and that contain data packets that are to be routed by said apparatus.

As the invention refers to routing in relation to a multi-channel bitstream carrying isochronous channels, the aspect of using the invention in a so-called DTM (Dynamic synchronous Transfer Mode) network forms a preferred embodiment.

As understood by those skilled in the art, a "header portion" according to the invention need not actually reside at the head end of a data packet, nor is it necessarily the destination address of the data packet that forms the essential part thereof. In fact, the actual location of a "header portion" according to the invention will be given by the protocol of interest. Similarly, the kind and/or amount of information that shall be transmitted to the routing processor according to the invention will depend upon, for example, the type of routing mechanism used, the type of network, and so on. For example, in some cases a source address or a channel identifier (physical or virtual) may be used instead of a destination address as basis for routing. Consequently, the invention is not limited to a specific kind of header portion.

The above mentioned and other aspects, advantageous and features of the invention will be more fully understood from the accompanying claims and from the following detailed description of exemplifying embodiments thereof.

BRIEF DESCRIPTION OF THE DRAWINGS

Exemplifying embodiments of the invention will now be described with reference to the accompanying drawings, wherein.

DETAILED DESCRIPTION OF AN EXEMPLIFYING EMBODIMENTS

An example of the structure of a multi-channel multi-access bitstream B in a circuit switched time division multiplexed network operating according to a DTM protocol will now be described with reference to FIG. 1.

Figure 1:
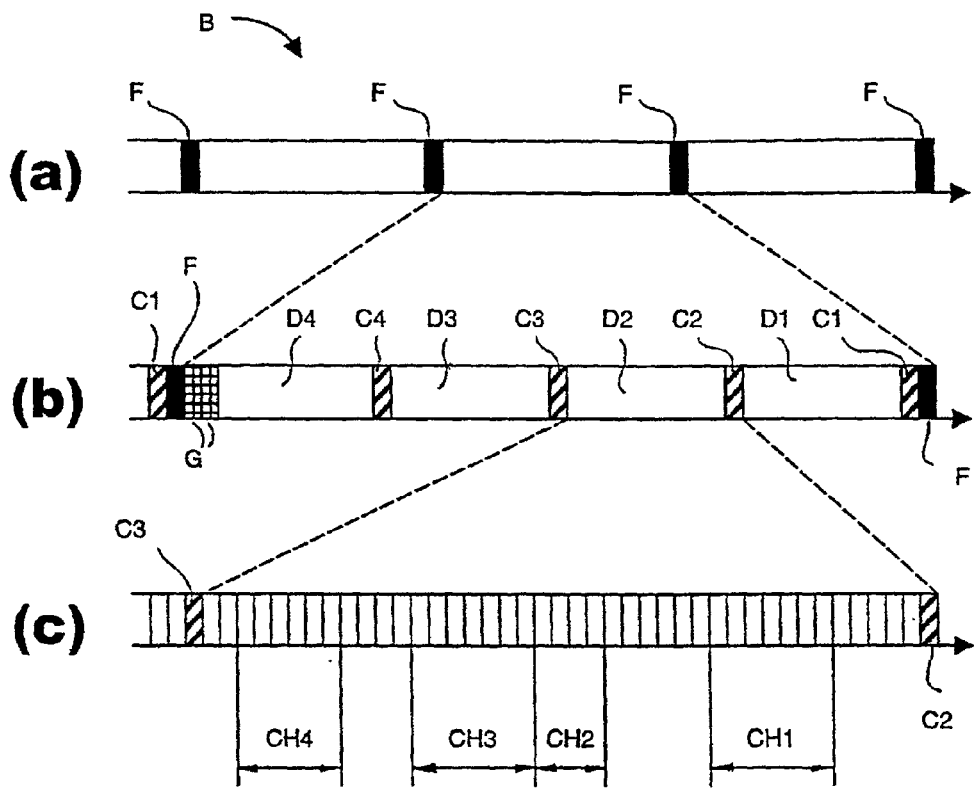
FIG. 1 schematically shows an example of the structure of a bitstream in a circuit switched time division multiplexed network operating according to a DTM protocol.

As shown in FIG. 1, the bitstream B is divided into recurrent, essentially fixed sized frames, wherein the start of each frame is defined by a frame synchronization time slot F. Each frame will have a duration of 125 $\mu$s.

Each frame is further divided into a plurality of fixed sized, typically 64 bit, time slots. When using said frame length of 125 $\mu$s, a time slot size of 64 bits, and a bit rate of 2 Gbps, the total number of time slots within each frame will be approximately 3900.

The time slots are divided into control slots C1, C2, C3, and C4, and data slots D1, D2, D3, and D4. The control slots are used for control signaling between the nodes of the network, whereas the data slots are used for the transfer of payload data. Each node connected to the bitstream B is typically allocated at least one control slot, i.e. each node will have write access to at least one control slot. Furthermore, write access to data slots are distributed among the nodes connected to the bitstream. As an example, a first node (connected to the bitstream B) will have access to a control slot C1 and a set of data slots D1 within each DTM frame of the bitstream, another node (also connected to the bitstream) will have access to a control slot C2 and a set of data slots D2 within each DTM frame of the bitstream, and so on. The set of slots allocated to a node as control slot(s) and/or data slot(s) occupy the same respective slot positions within each DTM frame of the bitstream. Hence, in the example, said first node's control slot C1 will occupy the second time slot within each DTM frame of the bitstream.

During network operation, each node may increase or decrease its access to control slots and/or data slots, thereby re-distributing the access to control slots and/or data slots among the nodes. For example, a node having a low transfer capacity demand may give away its access to data slots to a node having a higher transfer capacity demand. Furthermore, the slots allocated to a node need not be consecutive slots, but may reside anywhere within the frame.

Also, note that each DTM frame typically begins with said frame synchronization time slot, defining the frame rate on the bitstream, and ends with one or more guard band time slots G.

In FIG. 1 at (c), it is furthermore assumed that said second node, having access to its control slot C2 and its range of data slots D2, has established four channels CH1, CH2, CH3, and CH4 on the bitstream. As shown, each channel is allocated a respective set of slots. In the example, the transfer capacity of channel CH1 is larger than the transfer capacity of channel 2, since the number of time slots allocated to channel CH1 is larger than the number of time slots allocated to channel CH2. The time slots allocated to a channel occupy the same time slot positions within each recurrent DTM frame of the bitstream.

Figure 2:
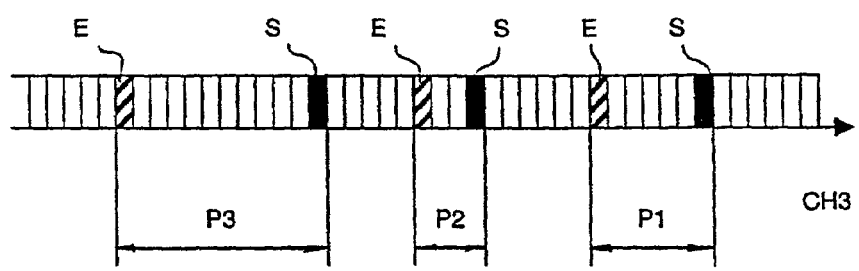
FIG. 2 schematically illustrates transfer of asynchronous traffic in one of the isochronous channels carried by the bitstream shown in FIG. 1.

An example of the transfer of asynchronous traffic in one of the isochronous channels carried by the bitstream B shown in FIG. 1 will now be described with reference to FIG. 2. In FIG. 2, it is assumed that the channel CH3 shown in FIG. 1 is established to carry asynchronous traffic in the form of sequentially transmitted variable size data packets, which for example may be TCP/IP packets or Ethernet frames. (Note that FIG. 2 only shows the sequence of sequential time slots transmitted within the channel CH3). Since FIG. 1 schematically indicates that channel CH3 comprises seven time slots within each DTM frame on bitstream B, the first seven time slots transmitted in the channel CH3, i.e. the first seven time slots in FIG. 2, will be transmitted in one DTM frame, the next seven time slots will be transmitted in the next DTM frame, and so on.

FIG. 2 shows data packets transmitted in channel CH3. Each data packet is encapsulated according to a predefined encapsulation protocol. It is assumed that the encapsulation protocol defines that each data packet shall be divided into 64 bit data blocks (corresponding to the size of a time slot), that a start_of_packet slot S is to be added to the start of each data packet, and that an end_of_packet slot E is to be added to the end of each data packet, thereby forming encapsulated data packets P1, P2, and P3. In case of gaps between packets, the bitstream is provided with so called idle slots, identifying said gaps as not providing valid data.

Figure 3:
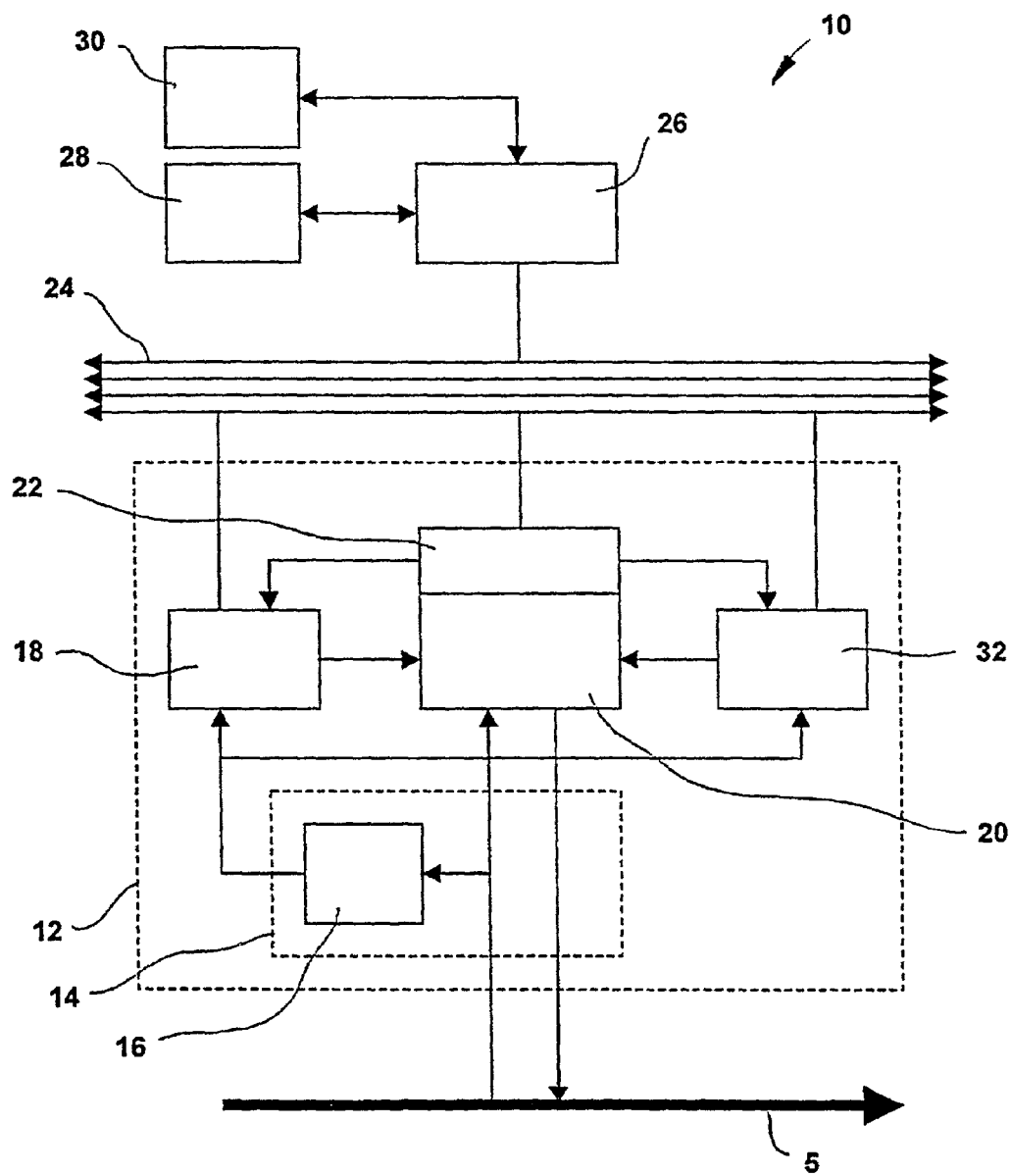
FIG. 3 schematically shows an exemplifying embodiment of an apparatus according to the invention.

An exemplifying embodiment of an apparatus according to the invention will now be described with reference to FIG. 3, wherein the apparatus 10 comprises an interface 12, a processor bus 24, and a router processor 26. The interface 12 provides read/write access to a multi-channel bitstream, for example of the kind described above with reference to FIGS. 1a–1c. The processor bus 24 provides a shared medium for communication between the router processor, the interface 26, and other interfaces (not shown) of the apparatus 10. The routing processor 26 provides routing of data packets received at the interfaces of the apparatus.

The interface 12 in turn comprises a network medium access unit 14, a time slot counter 16, an input direct memory access unit 18, a memory 20, a data packet processor 22, and an output direct memory access unit 32.

In operation, the medium access unit receives a continuous stream of data bits from the bitstream 5. Based upon frame synchronization information provided in the bitstream, the time slot counter 16 of the medium access unit 14 will count the time slot position currently being received on bitstream 5. This count is then provided to the input direct memory access 18 that will designate a memory location of memory 20, whereby the time slot data received on bitstream 5 is written into the memory location designated by the input direct memory unit. The input direct memory unit will then see to that a data packet received in a channel defined on bitstream 5 is stored at a selected memory location of memory 20.

Typically, each received data packet is encapsulated according to a predefined protocol and will received as a set of consecutive sequential 64 bit data blocks. The number of blocks encapsulating a data packet will depend on the size of the actual data packet.

As a data packet is being stored in memory 20, the data packet processor 22 will derive a header portion thereof, said header portion containing at least the destination address of said data packet, and will then transmit said header portion to the routing processor 26 via the processor bus 24. Note that, according to the invention, the data packet processor 22 does not transmit the entire data packet to the routing processor 26, but only a header portion thereof, thereby decreasing the capacity demand placed upon the internal processor bus.

The router processor typically has access to a routing table 28 and a data packet buffer 30, the latter being used when the operation of the routing processor requires temporary storage of a data packet or a portion thereof at the routing processor.

Having received a data packet header from the data packet processor 22, the router processor will derive the destination address thereof an access the routing table 28 for determining which output interface, port, and channel thereof to use when transmitting the data packet associated with said header. Having determined so, the routing processor will send a message to the data packet processor 22 via the processor bus, instructing said data packet processor 22 on which interface and channel that the associated data packet is to be transmitted via.

Having received said message from the routing processor 26, the data packet processor 22 will act according to the instruction provided therein. Typically this will involve one of the following measures: a) reading out the body of the data packet from the memory 20 and transmitting it to another interface (not shown) connected to the processor bus; b) instructing the output direct memory access unit 32 to transmit the data packet into a designated channel on bitstream 5; and c) discarding said data packet.

Having performed such measures, the data packet processor 22 will inform the input direct memory access unit 18 that the processing of said data packet is completed and that the input direct memory access unit 32 is free to use the memory location occupied by said data packet for storing of new data packets.

As is understood, the output direct memory access unit 32 will see to that data packets are read from the memory 20 and written into the appropriate channels on bitstream 5 in accordance with instructions received from the data packet processor 22 and in accordance with the time slot count provided by the counter 14.

Figure 4:
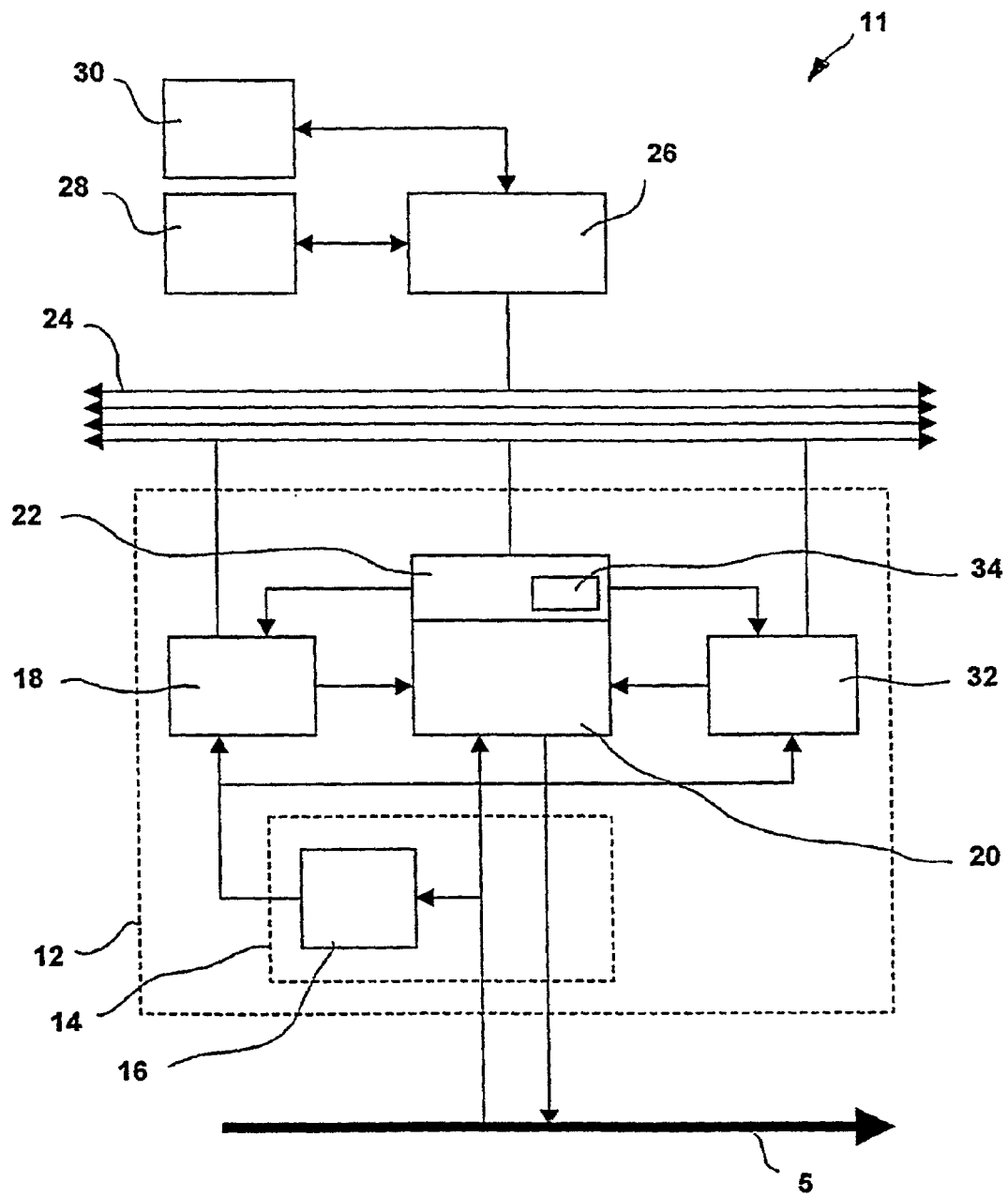
FIG. 4 schematically shows another exemplifying embodiment of an apparatus according to the invention.

Another embodiment of an apparatus according to the invention will now be described with reference to FIG. 4. In the apparatus 11 shown in FIG. 4, the only difference compared to the embodiment shown in FIG. 3 is that, in FIG. 4, the data packet processor 22 is provided with a cache routing table 34. The cache routing table contains a list of destination addresses that the routing processor 26 has previously determined shall be routed only to one or more channels on bitstream 5 or shall not be routed at all, i.e. shall be discarded or bypassed at the interface 12.

Consequently, when a received data packet is being stored in memory 20, the data packet processor will compare the destination address of the header thereof against the destination addresses contained in the cache routing table 34. If a match is found, the header portion of the data packet will not be transmitted to the routing processor 26. Instead, the data packet is discarded, bypassed, or routed to another channel on bitstream 5 based upon the information provided by said cache routing table 34, thereby further reducing the processing load on the routing processor 26 and the transfer capacity demand of the processor bus 24. In such an embodiment, any routing performed by the routing processor 26 may cause the routing table to instruct the data packet processor to update the cache routing table.

Note, that if the channel from which said data packet was received does not terminate at the apparatus 11 but instead/also continues to one or more other down-stream nodes, the data packet will be "bypassed", i.e. forwarded to downstream nodes in the same channel as it was received.

Even though the invention has been described above with reference to exemplifying embodiments thereof, these are not to be considered as limiting the scope of the invention. Consequently, as understood by those skilled in the art, different modifications, combinations and alterations may be made within the scope of the invention, which is defined by the accompanying claims.

What is claimed is:

1. An apparatus providing routing of asynchronous traffic in a circuit switched synchronous time division multiplexed network, said apparatus comprising:
   an interface (12) providing access to a multi-channel bitstream carrying isochronous channels;
   routing means (26) for providing routing of data packets; and
   a communication medium (24) interconnecting said interface and said routing means, wherein said interface (12) comprises means (18) for deriving data packets received in at least one of said isochronous channels, means (22) for transmitting only header portions of said data packets to said routing means via said communication medium (24), means (20) for temporarily storing at least body portions of said data packets, and means (22, 32) for forwarding said data packets in accordance with routing instructions received from said routing means.

2. An apparatus as claimed in claim 1, wherein said interface (12) comprises selecting means (43) for determining if a header portion of a data packet is to be sent to said routing means (26), and wherein said means (22) for transmitting only header portions of said data packets to said routing means (26) are arranged to control the transmission of header portions according to decision made by said selecting means.

3. An apparatus as claimed in claim 2, wherein said selecting means (43) comprises a table designating destination addresses of data packets for which the header portions thereof are not to be transmitted to said routing means.

4. An apparatus as claimed in claim 2, wherein said selecting means (43) comprises a table designating destination addresses of data packets that are to be discarded at said interface.

5. An apparatus as claimed in claim 2, wherein said selecting means (43) comprises a table designating destination addresses of data packets that are to be transmitted to one or more of the isochronous channels of said multi-channel bitstream that is accessed by said interface.

6. An apparatus as claimed in claim 2, wherein said selecting means (43) comprises a cache memory that is continuously updated with routing information provided by said routing means.

7. An apparatus as claimed in claim 1 or 2, wherein said forwarding of a data packet in accordance with routing instructions received from said routing means (26) comprises at least one measure in the group consisting of: forwarding said data packet to another interface connected to said communications medium (24); forwarding said data packet to said routing processor (26); forwarding said data packet to a channel of said multi-channel bitstream; and discarding said data packet.

8. An apparatus as claimed in claim 1 or 2, wherein said interface (12) comprises means (22) for determining which channels of said multi-channel bitstream that are to be received by said interface (12) and that contain data packets that are to be routed by said apparatus.

9. An apparatus as claimed in claim 1 or 2, wherein said interface (12) comprises means for bypassing channels of said multi-channel bitstream that are not to be received by said apparatus.

10. An apparatus as claimed in claim 1, wherein said data packets, when transmitted within said channels, are encapsulated according to a predefined encapsulation protocol.

11. An apparatus as claimed in claim 1, wherein said communication medium (24) is a shared medium connecting said interface and one or more other interfaces with said routing means.

12. An apparatus as claimed in claim 1, wherein said medium (24) is a communication bus interconnecting said interface and said routing means.

13. An apparatus as claimed in claim 1, wherein said routing means (26) are arranged to also perform routing in relation to data packets received at one or more other interfaces of the apparatus.

14. An apparatus as claimed in claim 13, wherein said communication medium (24) is arranged to interconnect said one or more other interfaces and said routing means (26).

15. An apparatus as claimed in claim 1, wherein said network is operating according to a Dynamic synchronous Transfer Mode (DTM) protocol.

16. An apparatus as claimed in claim 1, wherein said bitstream is a multi-access bitstream.

* * * * *